United States Patent
Nakamura

(12) 
(10) Patent No.: US 6,431,768 B1
(45) Date of Patent: Aug. 13, 2002

(54) DIGITAL CAMERA HAVING ROTATABLE OPTICAL VIEWFINDER UNIT

(75) Inventor: Yoko Nakamura, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/536,292

(22) Filed: Mar. 27, 2000

(30) Foreign Application Priority Data

Mar. 25, 1999 (JP) ............................................. 11-080918

(51) Int. Cl.⁷ ................................................. G03B 17/02
(52) U.S. Cl. ....................... 396/348; 396/375; 348/341; 348/373
(58) Field of Search ................................. 396/373, 375, 396/348, 439, 535, 537, 541, 545, 6, 382, 383; 348/341, 373, 374, 375, 376

(56) References Cited

U.S. PATENT DOCUMENTS

| | | | | |
|---|---|---|---|---|
| 1,060,636 A | * | 5/1913 | Ruttan et al. ............. 396/383 |
| 1,678,493 A | * | 7/1928 | Albada ....................... 396/382 |
| 2,213,942 A | * | 9/1940 | Riszdorfer ................. 396/293 |
| 2,396,869 A | * | 3/1946 | McDonald, Jr. et al. .... 396/446 |
| 2,487,773 A | * | 11/1949 | Schwartz et al. .......... 396/382 |
| 3,393,623 A | * | 7/1968 | Gutmann et al. ........... 396/377 |
| 4,032,940 A | * | 6/1977 | Chan .......................... 396/348 |
| 4,216,589 A | * | 8/1980 | Beaver ........................ 33/266 |
| 4,992,875 A | * | 2/1991 | Shintani et al. ............ 348/341 |
| 5,005,032 A | * | 4/1991 | Burnham .................... 396/178 |
| 5,282,040 A | * | 1/1994 | Sapir .......................... 348/220 |
| 5,561,458 A | * | 10/1996 | Cronin et al. ............... 348/233 |
| 5,739,859 A | * | 4/1998 | Hattori et al. .......... 348/333.06 |
| 5,754,902 A | * | 5/1998 | Huang et al. ............... 396/381 |
| 6,132,111 A | * | 10/2000 | Zhong ........................ 396/411 |

OTHER PUBLICATIONS

Ricoh—Multimedia Digital Camera RDC—2, 1996.
Ricoh—Personal Digital Camera RDC—3000, 1997.

* cited by examiner

*Primary Examiner*—David M. Gray
(74) *Attorney, Agent, or Firm*—Oblon, Spivak, McClelland, Maier & Neustadt, P.C.

(57) ABSTRACT

A digital camera having a camera body which includes a main surface and a lens surface substantially orthogonal to the main surface, a photographic lens of a photographic optical system positioned on the lense surface, and an optical viewfinder unit rotatably attached to the main surface such that the optical viewfinder unit is rotatable to a position substantially orthogonal to the main surface of the camera body and in a plane substantially parallel to said lens surface. An operation unit is positioned in the camera body such that operations buttons are arranged on the main surface of the camera body and, when the optical viewfinder unit is in a closed position, the operation buttons are substantially covered to protect against unintentional operation.

26 Claims, 7 Drawing Sheets

DIGITAL CAMERA HAVING ROTATABLE OPTICAL VIEWFINDER UNIT

CROSS REFERENCE TO RELATED APPLICATIONS

This document claims priority and contains subject matter related to Japanese Patent Application No. 11-080918 filed in the Japanese Patent Office on Mar. 25, 1999, the entire contents of which are incorporated by reference.

BACKGROUND OF THE INVENTION

1. Field of the Invention

The present invention relates to a digital camera that stores image information obtained by an imaging device in a recording medium, and more particularly to a digital camera which is compact and has the convenience of portability.

2. Discussion of the Background

A camera using a photographic film (i.e. a silver halide film camera) has been generally used for photography. Recently, digital cameras have become increasingly widespread. In the digital cameras, object images, such as static images (still images) and moving images (movie images), are photographed by a solid-state imaging device, such as a charged coupled device (CCD) or the like, and image data of the object image are obtained and digitally recorded in a recording medium such as an IC (integrated circuit) card, a printed circuit (PC) card with semiconductor memory, a video floppy disk, or the like.

In the above-described digital camera, almost all functions, except for optical sub-systems, are digitally performed, including basic photographing functions, add-on accessory functions, etc. Because image data is digitally recorded in the recording medium instead of a photographic film, spaces for a film feeding unit and a film winding mechanism are not necessary in the digital camera. Therefore, a layout of each functional element of the digital camera can be more flexibly made, and the size of the digital camera can be more compact than that of the camera using a photographic film. Moreover, operability, portability, and appearance of digital camera can be enhanced by contriving to appropriately design the layout of each element of the digital camera.

Because a camera is usually equipped as a portable device for photographing various events, demand for a compact camera has increased. For example, the "one-time-use camera" or "disposal camera" using a photographic film has come into widespread use. This type of camera is made handy, and low in cost by reducing functions of the camera.

Similarly, with the widespread use of the digital camera, there is an increasing demand for a handy, portable, and low-cost digital camera.

In order to reduce the size of the digital camera, main elements of the digital camera need to be miniaturized including a photographic optical system, an imaging device, a recording medium, a digital circuit unit, a power supply battery, etc. Moreover, a viewfinder for confirming a photographing range, which is likely to occupy a relatively large space in the digital camera, also needs to be compact in the digital camera.

SUMMARY OF THE INVENTION

Accordingly, one object of the present invention is to provide a novel digital camera which is compact and has the convenience of portability.

Another object of the present invention is to provide a novel digital camera which has a simple configuration and is low in cost.

The digital camera of the present invention includes a camera body having a main surface and a lens surface substantially orthogonal to the main surface, a photographic lens of a photographic optical system, the photographic lens positioned on the lense surface, and an optical viewfinder unit rotatably attached to the main surface such that the optical viewfinder unit is rotatable to a position substantially orthogonal to the main surface and in a plane substantially parallel to the lens surface.

In one embodiment, the optical viewfinder unit includes a planar structure having a square shaped optical viewfinder window which serves as a field frame for defining a range of an object image, the main surface includes first and second opposing edges and the optical viewfinder unit is rotatably attached to the main surface at an axis parallel to and in the vicinity of the second edge, and a length and width of the optical viewfinder window are set according to a field angle of the photographic lens and a width of the camera body defined by a distance from the first edge to the second edge of the main surface.

In another embodiment, the digital camera further includes a view plate rotatably attached to the main surface at an axis in the vicinity of the first edge such that the view plate is moveable to a position substantially orthogonal to the main surface and substantially parallel to the surface of the optical viewfinder window, the view plate having a hole positioned such that a center of the hole is substantially in line with an orthogonal line extending from a center of the optical viewfinder window.

In yet another embodiment, the optical viewfinder unit includes a planar structure having a square shaped optical viewfinder window, at least one transparent member positioned in the optical viewfinder window, and a pattern of marks printed on the at least one transparent member and configured to assist a user of the digital camera in defining a photographing range of an object image. The at least one transparent member may be a single transparent member having a predetermined thickness and having the pattern of marks printed on opposing sides of the transparent member, or alternatively may be two or more transparent members each having a portion of the pattern of marks printed thereon. The position of the pattern of marks is determined according to the thickness of the transparent member or the distance between transparent members, and a field angle of a photographing lens of the photographic optical system.

In yet another embodiment of the present invention, the optical viewfinder unit is rotatable from a closed position wherein the optical viewfinder unit is in planar contact with the main surface, to an open position wherein the optical viewfinder unit is in the position substantially orthogonal to the main surface and in a plane substantially parallel to the lens surface, and the digital camera includes a power switch configured to be in an on state when the optical viewfinder is in the open position, and in an off state when the optical viewfinder is in the closed position.

In still another embodiment, the digital camera includes an operation unit having at least one operation button arranged on the main surface, wherein when the optical viewfinder unit is in the closed position, the at least one operation button is covered and protected from unintentional operation.

Finally, another embodiment of the digital camera includes a release button of an operation unit is arranged on an upper surface of a camera body. The upper surface of the camera body is substantially orthogonal to a surface where an object lens of a photographic optical system is exposed. An optical viewfinder unit is rotatable around an axis that is provided in the vicinity of the edge of the upper surface, connecting to the edge of the surface where the object lens of the photographic optical system is exposed. The optical viewfinder unit rotates approximately 90-degree angle from the position in which the optical viewfinder unit is in planar contact with the upper surface of the camera body. When the optical viewfinder unit is in planar contact with the upper surface of the camera body, the optical viewfinder unit covers at least the release button of the operation unit. The optical viewfinder unit rotates to the position in which the optical viewfinder unit vertically stands relative to the upper surface of the camera body so that the optical viewfinder unit is used for confirming a photographing range of an object image.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
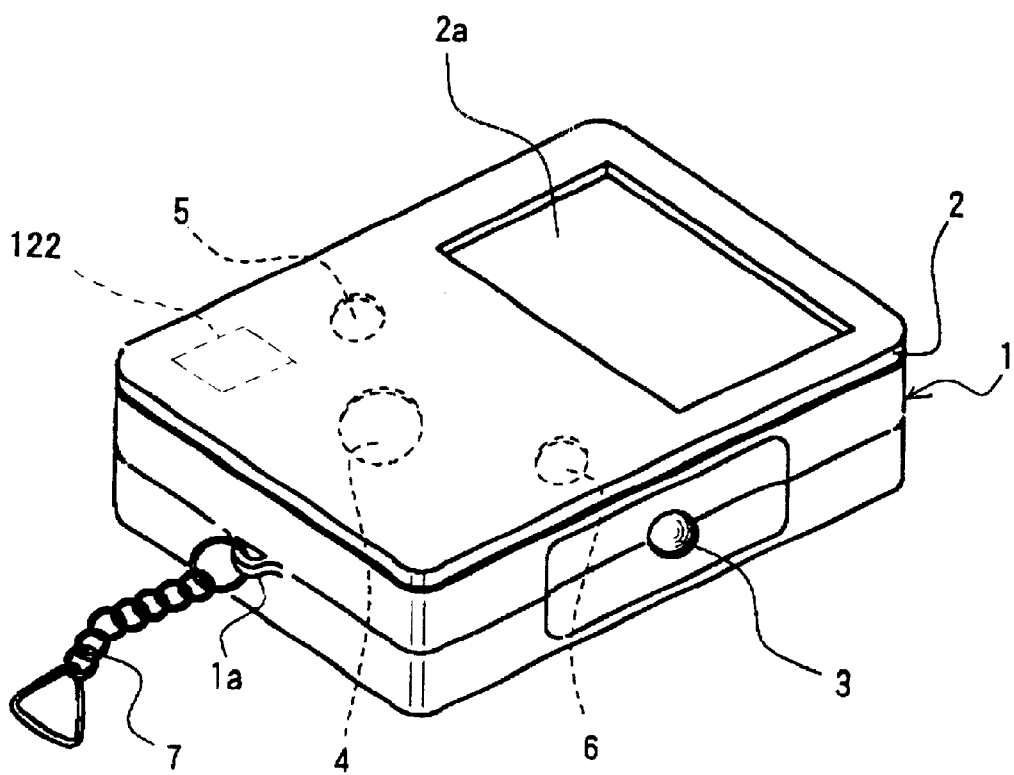
FIG. 1 is a perspective view illustrating an outward appearance of a digital camera according to a first embodiment of the present invention when the digital camera is not in a photographing mode.
Figure 2:
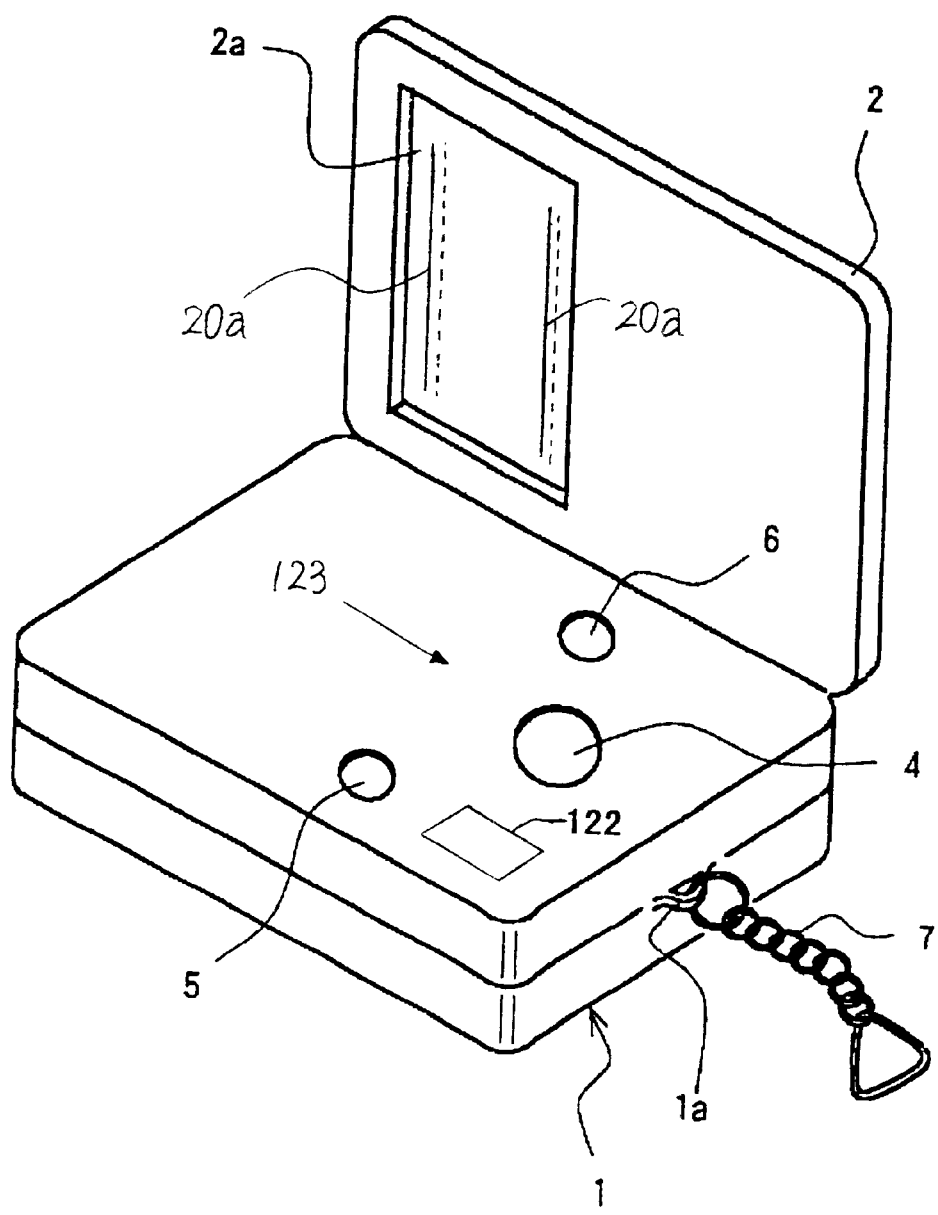
FIG. 2 is a perspective view illustrating an outward appearance of the digital camera according to the first embodiment of the present invention when the digital camera is in the photographing mode.

Referring now to the drawings, wherein like reference numerals designate identical or corresponding parts throughout the several views, embodiments of the present invention are now described. FIG. 1 is a perspective view illustrating an outward appearance of a digital camera according to a first embodiment of the present invention when the digital camera is not in a photographing mode. FIG. 2 is a perspective view illustrating an outward appearance of the digital camera according to the first embodiment of the present invention when the digital camera is in the photographing mode. The digital camera illustrated in FIGS. 1 and 2 includes a camera body 1, an optical viewfinder unit 2, a photographic optical system 3, a release button 4, a photographing mode button 5, a transmission button 6, a display unit 122, and a chain (or a strap) 7.

The camera body 1 is formed, for example, in the shape of an approximately rectangular solid and includes a chain attaching part 1a on one side surface thereof. For the convenience of portability, the camera body 1 is formed in a compact rectangular solid of about 60 mm (length)×about 40 mm (width)×about 15 mm (height).

Provided on an upper surface of the camera body 1 is the optical viewfinder unit 2. Further, the photographic optical system 3 is provided to one side surface of the camera body 1 such that an object lens of the photographic optical system 3 is visible from the outside of the camera body 1. The optical viewfinder unit 2 is rotatably hinged on the upper edge of the side surface where the object lens of the photographic optical system 3 is exposed. Moreover, the optical viewfinder unit is of simple construction and provides a view of the actual image to be photographed as opposed to using a Liquid Crystal Display or other electronic device to generate or display an image being photographed or captured. This construction allows the digital camera of the present invention to be compact and light weight.

Specifically, the optical viewfinder unit 2 is rotatable around an axis which is provided in the vicinity of and parallel to the edge of the upper surface of the camera body 1. The optical viewfinder unit 2 rotates approximately 90-degrees from the position in which the optical viewfinder unit 2 is in intimate planar contact with the upper surface of the camera body 1 (hereinafter referred to as the closed position) to the position in which the optical viewfinder unit 2 vertically stands (hereinafter referred to as the opened position). Although it is not shown, a mechanism for locking the optical viewfinder unit 2 at the opened position is provided in the camera body 1 to prevent the optical viewfinder unit 2 from unintentionally rotating from the opened position to the closed position. Further, a power supply switch (not shown in FIGS. 1 and 2, but indicated by reference numeral 130 in FIG. 7) is provided in the camera body 1 and is switched on and off in response to the operation of the optical viewfinder unit 2. Specifically, the power supply switch 130 is configured to turn on a power supply (not shown) of the digital camera when the optical viewfinder unit 2 reaches the opened position and vertically stands to the upper surface of the camera body 1, and is configured to turn off the power supply of the digital camera when the optical viewfinder unit 2 reaches the closed position.

Figure 3:
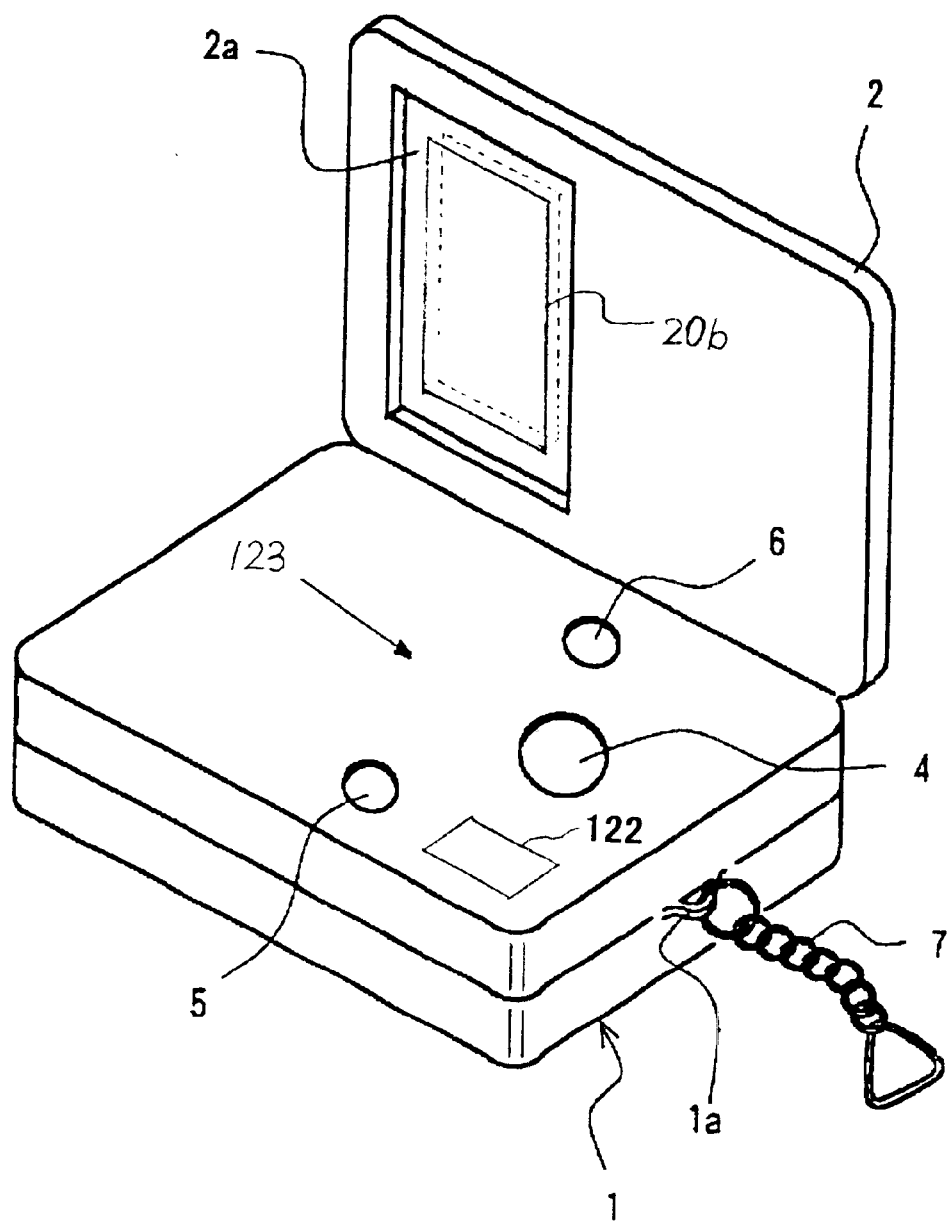
FIG. 3 is a perspective view of the digital camera according to the first embodiment of the present invention in which square frames are printed on transparent members.

In the optical viewfinder unit 2, a transparent optical viewfinder window 2a is formed in a square shape and is typically called an action viewfinder or a sports viewfinder. The transparent optical viewfinder window 2a includes two or more transparent members, such as glass or plastic, which are spaced apart from each other a predetermined distance. A pair of frame lines 20a for defining a photographing range of an object image is printed on each of the transparent members such that respective frame lines 20a are parallel to the sides of the transparent optical viewfinder window 2a. The length of the frame lines 20a and the distance between the frame lines 20a on respective transparent members are determined according to the distance between the transparent members and a field angle of a photographing lens of the photographic optical system 3. The user looks at an object image through the transparent optical viewfinder window 2a, and can confirm the photographing range which is defined by adjusting a distance between the user's eye and the transparent optical viewfinder window 2a such that respective frame lines 20a on the front and back transparent members are overlaid. In order for the user to more easily confirm the photographing range, a pair of lines connecting both ends of the frame lines 20a to form square frames 20b may be printed on the respective transparent members as illustrated in FIG. 3. The square frames 20b may be printed on the respective transparent members in a similar manner. Alternatively, the transparent optical viewfinder window 2a may include only one transparent member having a predetermined thickness. Each pair of frame lines 20a may be printed on the front and back surface thereof. The length of the frame lines 20a and the distance between the frame lines 20a on respective transparent members are determined according to the thickness of the transparent member and the field angle of the photographing lens of the photographic optical system 3.

Figure 4:
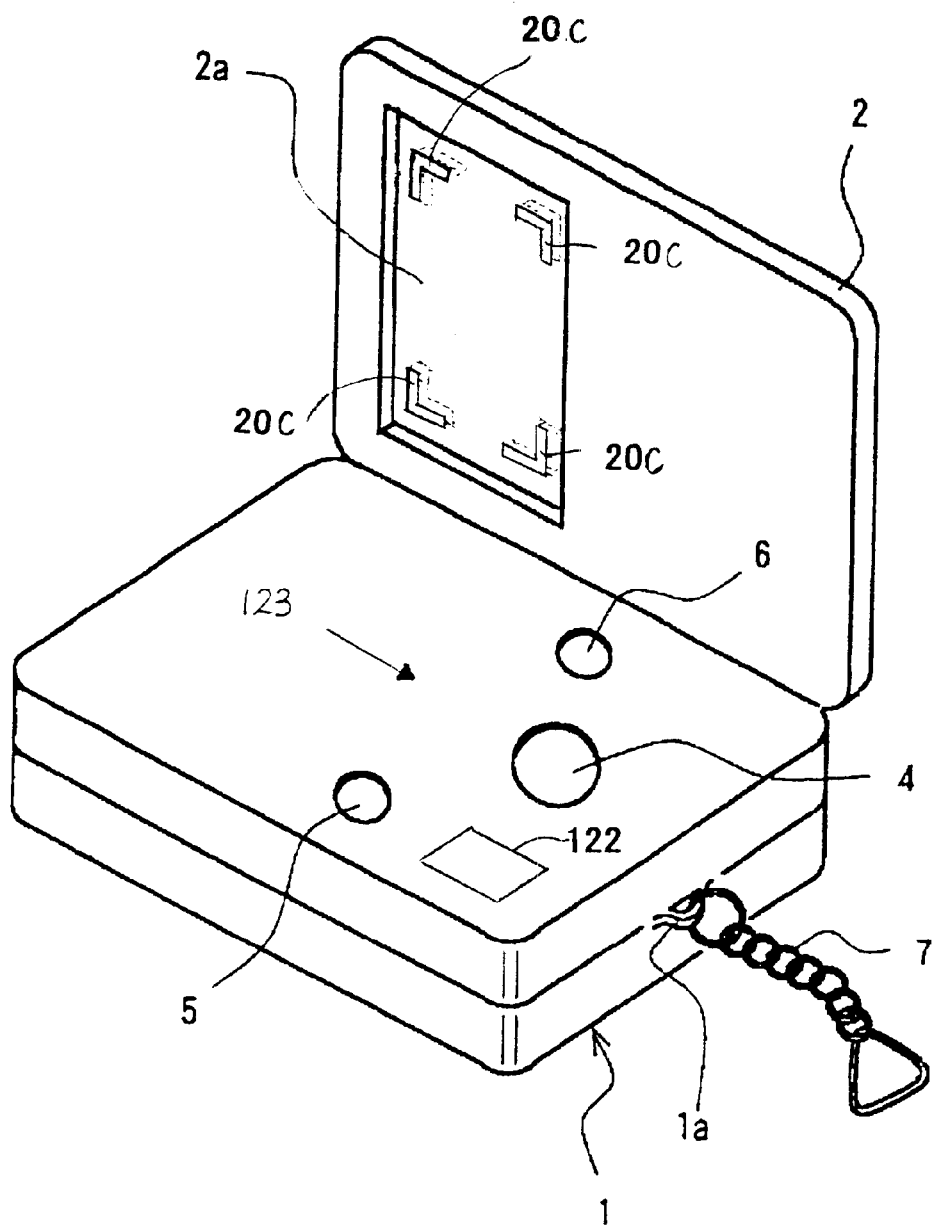
FIG. 4 is a perspective view of the digital camera according to the first embodiment of the present invention in which L-shaped marks are printed on the transparent members.

Instead of the pair of frame lines 20a and square frames 20b, various patterns of marks may be printed on the transparent member. On the transparent member in FIG. 4, L-shaped marks 20c are printed near four corners of the transparent optical viewfinder window 2a, respectively, for defining the photographing range. Similar to the frame lines 20a illustrated in FIG. 2, the positions where the L-shaped marks 20c are printed on respective transparent members are determined according to the distance between the transparent members and the field angle of the photographing lens of the photographic optical system 3. Alternative shapes of the L-shaped marks 20c may be employed, such as a circle.

Arranged on the upper surface of the camera body 1 are the release button 4, the photographing mode button 5, the transmission button 6, and the display unit 122. The release button 4 is used for executing a photographing operation (i.e., an image taking in/recording operation). The photographing mode button 5 is used for switching the photographing mode. The transmission button 6 is used for transmitting the data of a recorded image to an external computer (e.g., a personal computer) that is connected to the digital camera. The display unit 122 includes, for example, a liquid crystal display (LCD) device or a light-emitting device, and displays messages indicating the operational conditions of the digital camera, such as the photographing mode.

When the optical viewfinder unit 2 is closed (i.e., when the optical viewfinder unit 2 is in intimate contact with the upper surface of the camera body 1), the optical viewfinder unit 2 covers and protects the release button 4, the photographing mode button 5, and the transmission button 6 arranged on the upper surface of the camera body 1 from being unintentionally operated.

The chain attaching part 1a of the camera body 1 is used for attaching thereto the removable chain 7 (e.g., a key holding chain) for holding the digital camera. The user may hook the chain 7 on his or her clothing to carry the digital camera.

When the user does not photograph and carries the digital camera, as illustrated in FIG. 1, if the optical viewfinder unit 2 is closed to be in intimate contact with the upper surface of the camera body 1, the optical viewfinder unit 2 covers and protects the release button 4, the photographing mode button 5, and the transmission button 6. Further, as described above, the power supply switch 130 turns off the power supply of the digital camera. Therefore, erroneous operations of the digital camera can be avoided. Moreover, because the digital camera is compact in the closed condition, the user can carry the digital camera, for example, in a pocket or handbag.

When the user photographs, as illustrated in FIG. 2, the optical viewfinder unit 2 is opened so as to stand vertically to the camera body 1. Further, as described above, the power supply switch 130 turns on the power supply of the digital camera when the optical viewfinder unit 2 is opened. Therefore, the user can confirm a photographing range of an object image in a clear and appropriate visual condition in the transparent optical viewfinder window 2a.

Figure 5:
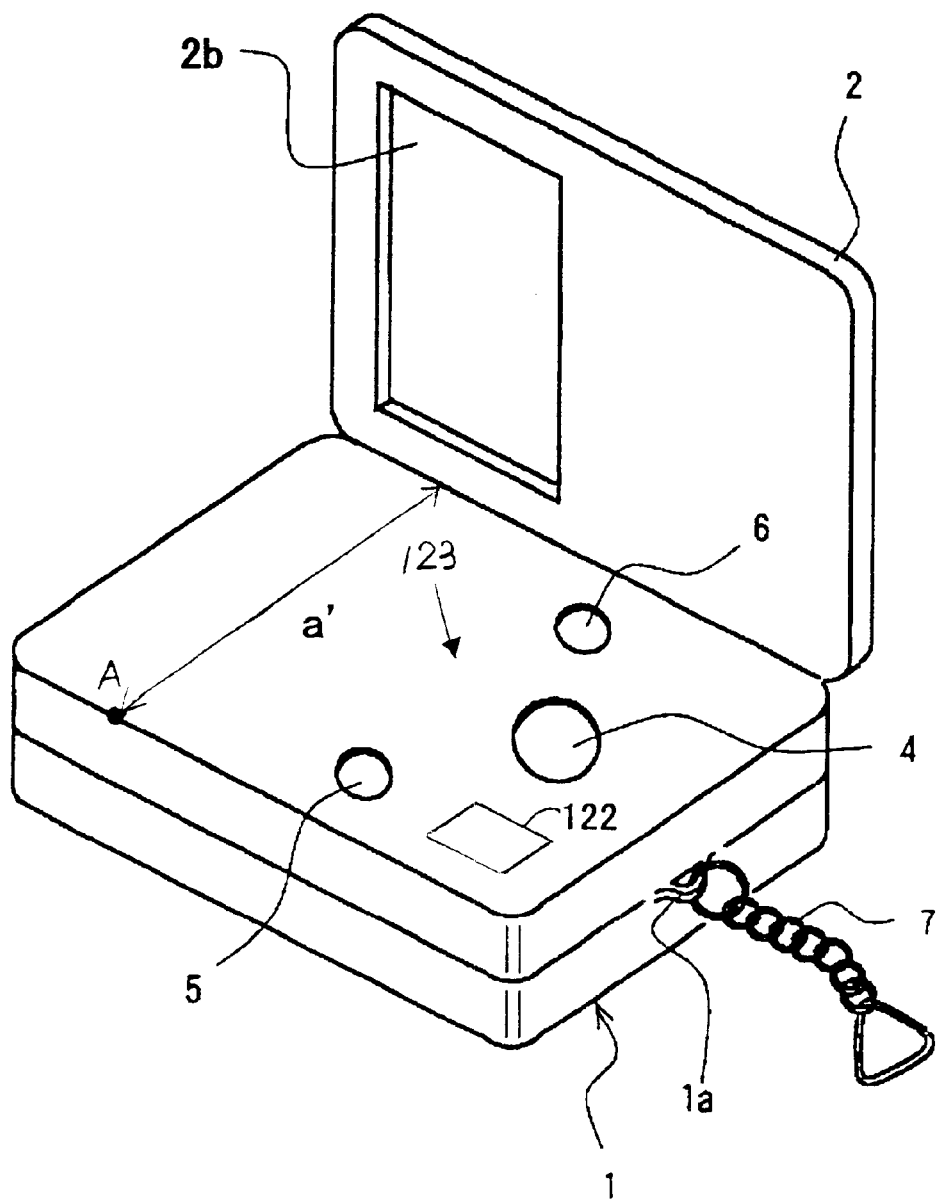
FIG. 5 is a perspective view illustrating an outward appearance of a digital camera according to a second embodiment of the present invention when the digital camera is in a photographing mode.

Referring to FIG. 5, a digital camera according to a second embodiment of the present invention is described. FIG. 5 is a perspective view illustrating an outward appearance of the digital camera according to the second embodiment of the present invention when the digital camera is in a photographing mode. The configuration of the digital camera of the second embodiment is substantially the same as that of the first embodiment illustrated in FIGS. 1 and 2 except the optical viewfinder unit 2. The optical viewfinder unit 2 of the digital camera of the second embodiment includes a square-shaped optical viewfinder window 2b in which no transparent member is provided. In other words, the optical viewfinder window 2b serves as a field frame. The length and width of the optical viewfinder window 2b are set according to the field angle of the photographic lens of the photographic optical system 3 and the width of the camera body 1 indicated by reference character a' in FIG. 5. The user looks at an object image through the optical viewfinder window 2b to confirm the photographing range of the object image. More specifically, the user puts, for example, his/her nose at a position A in FIG. 5 such that the middle point between his/her eyes is positioned substantially in line with an orthogonal line extending from the center of the optical viewfinder window 2b, and the eyes arc substantially parallel to the surface of the optical viewfinder window 2b. A view illustrating an outward appearance of the digital camera of the second embodiment when the digital camera is not in a photographing mode is omitted, because the view is substantially the same as FIG. 1.

Figure 6:
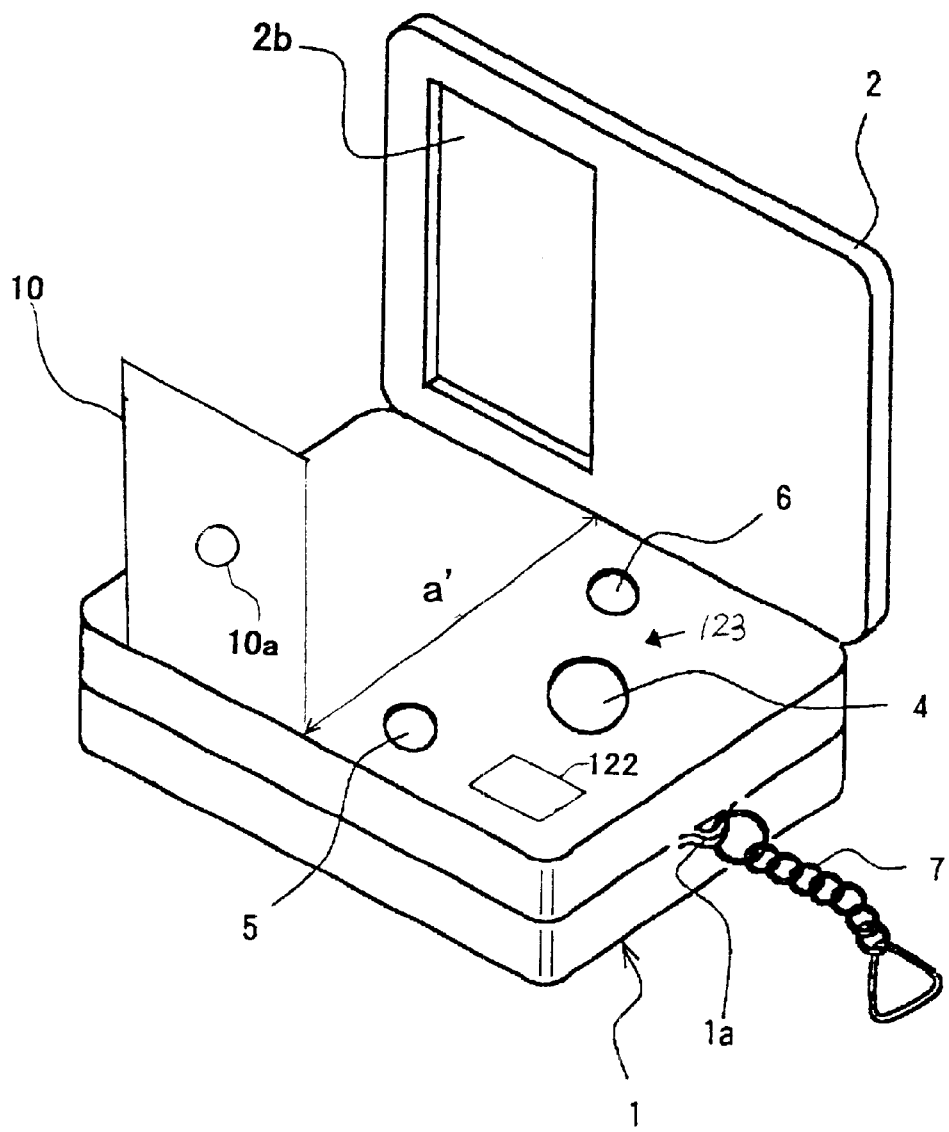
FIG. 6 is a perspective view illustrating an outward appearance of a digital camera according to a third embodiment of the present invention when the digital camera is in a photographing mode.

Referring to FIG. 6, a digital camera according to a third embodiment of the present invention is described. FIG. 6 is a perspective view illustrating an outward appearance of the digital camera according to the third embodiment of the present invention when the digital camera is in a photographing mode. A view illustrating an outward appearance of the digital camera of the third embodiment when the digital camera is not in a photographing mode is also omitted because the view is substantially the same as FIG. 1. The configuration of the digital camera of the third embodiment is substantially the same as that of the second embodiment illustrated in FIG. 5 except the provision of a view plate 10. The view plate 10 is configured to stand substantially parallel to the surface of the optical viewfinder window 2b and has a hole 10a such that the center of the hole 10a is positioned substantially in line with an orthogonal line extending from the center of the optical viewfinder window 2b. The diameter of the hole 10a is in a range of about 4 mm to about 7 mm. The view plate 10 is hinged to the edge of the upper surface of the camera body 1 which is opposite and substantially parallel to the other edge of the upper surface of the camera body 1 to which the optical viewfinder unit 2 hinged. The view plate 10 is rotatable approximately 90-degrees about an axis in the vicinity of the edge of the upper surface of the camera body 1 to which the view plate 10 is hinged. The view plate 10 vertically stands relative to the upper surface of the camera body 1 by rotating from a closed position (i.e., a position in which the view plate 10 is in intimate contact with the upper surface of the camera body 1). A mechanism (not shown) for locking the view plate 10 when the view plate 10 is in the opened position is provided in the camera body 1 to keep the view plate 10 vertically standing relative to the upper surface of the camera body 1. When the user photographs, the user opens and rotates the optical viewfinder unit 2 and the view plate 10 to vertically stand relative to the upper surface of the camera body 1, respectively, and to face each other in parallel. The user confirms a photographing range of an object image by looking at the object image through the hole 10a of the view plate 10 and the optical viewfinder window 2b. Like the optical viewfinder window 2b of the second embodiment, the length and width of the optical viewfinder window 2b are set according to a field angle of a photographing lens of the photographic optical system 3 and the width a' of the camera body 1. Although the number of construction parts of the digital camera of the third embodiment is more than that of the digital camera of the second embodiment, it is easier for the user to confirm a photographing range of an object image using the view plate 10 with the hole 10a.

Figure 7:
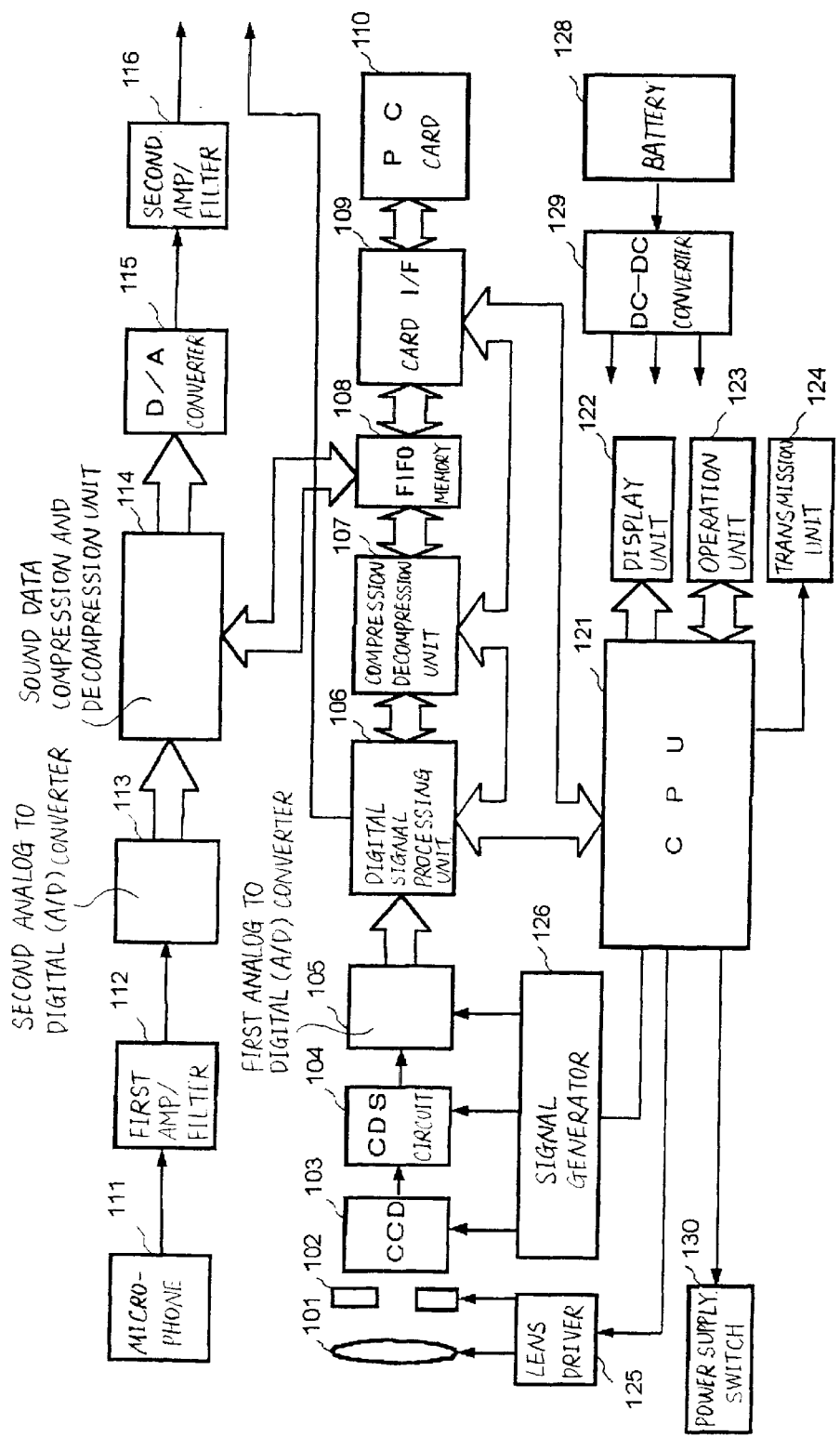
FIG. 7 is a block diagram illustrating an electrical system configuration of the digital camera of FIGS. 1 through 6 of the present invention.

The electrical system configuration of the digital cameras illustrated in FIGS. 1 through 6 is now described referring to FIG. 7. The exemplary digital cameras according to the embodiments of the present invention photograph not only static images (i.e., still images) in a static image capture mode, but also moving images in a movie capture mode in which moving image and sound are recorded for a short time.

The digital camera illustrated in FIG. 7 includes a lens system 101, a shutter mechanism 102, a charge coupled device (CCD) 103, a correlate dual sampling (CDS) circuit 104, a first analog to digital (A/D) converter 105, a digital signal processing unit 106, a compression and decompression unit 107, a first-in first-out (FIFO) memory 108, a card interface (I/F) 109, a PC card 110, a microphone 111, a first amplifier and filter (AMP/FILTER) 112, a second analog to digital (A/D) converter 113, a sound data compression and decompression unit 114, a digital to analog (D/A) converter 115, a second amplifier and filter (AMP/FILTER) 116, a central processing unit (CPU) 121, the display unit 122, an operation unit 123, a transmission unit 124, a lens driver 125, a signal generator (SG) 126, a battery 128, a DC-DC converter 129, and a power supply switch 130.

The photographic optical system 3 for image focusing includes the lens system 101 and the shutter mechanism 102. The shutter mechanism 102 includes an aperture mechanism and a filter mechanism, and controls an exposure time when a shutter is released. The shutter mechanism 102 may include an auto focus (AF) mechanism. As the imaging device, the CCD 103 is used in this embodiment. The CCD 103 converts optical images, which are imaged through the photographic optical system 3, into electrical signals.

The photograph process system of the digital camera for processing the optical image signals includes the CDS circuit 104, the first A/D converter 105, the digital signal processing unit 106, the compression and decompression unit 107, the FIFO memory 108, and the CPU 121.

The CDS circuit 104 reduces noise in the electrical signals output from the CCD 103. The first A/D converter 105 converts the analog image signals, which are input thereto from the CCD 103 through the CDS circuit 104, into digital image data. In further detail, the A/D converter 105 converts the signals output from the CCD 103 to digital signals through the CDS circuit 104 with an optimum sampling frequency.

The digital signal processing unit 106 separates the digital image data, which is input thereto from the A/D converter 105, into a color-difference component and a luminance component, and then performs various processes on each component, including a correcting process and a pre-process for compression/decompression. The compression/decompression unit 107 compresses the image data with, e.g., an orthogonal transformation and a Huffman encoding, and decompresses the image data with, e.g., a corresponding Huffman decoding and an inverse orthogonal transformation in conformity with the Joint Photographic Expert Group (JPEG) standard.

Sound is converted to electrical signals by the microphone 111. In the first AMP/FILTER 112, the sound signals in a predetermined band are passed through the first AMP/FILTER 112 and are selectively amplified. The second A/D converter 113 then converts the sound signals which have passed through the first AMP/FILTER 112 to digital sound data with a sampling frequency which is more than double the frequency of the predetermined band. Then, the sound data compression and decompression unit 114 compresses and encodes the digital sound data.

The FIFO memory 108 is a temporary memory device, such as a dynamic random access memory (DRAM), static RAM, a flash memory, or the like. The FIFO memory 108 temporarily stores compressed image data and sound data therein. The compressed image data and sound data are read out by the card interface 109, and are recorded in the PC card 110 serving as a record medium connected to the card interface 109. The PC card 110 contains a semiconductor memory or a recognized equivalent for recording information.

The CPU 121 controls operations of each unit of the digital camera according to instructions from the operation unit 123. As mentioned above, the display unit 122 includes, for example, a liquid crystal display (LCD) device or a light-emitting device, and displays messages indicating the operational conditions of the digital camera, such as the photographing mode.

When transmitting data to an external device such as, for example, a personal computer, the data recorded in the PC card 110 is read out through the card interface 109 and the FIFO memory 108, decompressed by the compression/decompression unit 107, and then provided to the external device through the digital signal processing unit 106. The sound data is decompressed by the sound data compression and decompression unit 114 through the FIFO memory 108, converted to analog signals by the digital to analog (D/A) converter 115, and is output through the second amplifier and filter (AMP/FILTER) 116.

The operation unit 123 includes various operation devices, such as the release button 4 for inputting a photographing instruction, the photographing mode button 5, and the transmission button 6 which are illustrated in FIG. 2. The transmission unit 124 is controlled by the CPU 121 to transmit the image data output from the digital signal processing unit 106 and the sound data output from the second amplifier and filter (AMP/FILTER) 116 to an external device (e.g., a computer), when the transmission button 6 of the operation unit 123 is operated.

The lens driver 125 drives the photographing lens system 101 and the shutter mechanism 102 according to a control signal provided by the CPU 121. The signal generator 126 generates drive control signals such as clock signals, and provides the drive control signals to the CCD 103, CDS circuit 104, and A/D converter 105 to drive each unit.

A power supply unit of the digital camera includes the battery 128 and the DC-DC converter 129. As the battery 128, a nickel cadmium battery, a nickel hydrogen battery, or a lithium battery is used. The voltage is converted to an appropriate level by the DC-DC converter 129 to be supplied to each unit of the digital camera.

As described above, the power supply switch 130 switches the power supply in response to the open/close operations of the optical viewfinder unit 2 relative to the camera body 1. Specifically, the power supply switch 130 turns on the power supply of the digital camera when the optical viewfinder unit 2 is opened to vertically stand relative to the camera body 1, and turns off the power supply of the digital camera when the optical viewfinder unit 2 is closed to be in intimate contact with the upper surface of the camera body 1. The power supply switch 130 sends control signals to the CPU 121 to perform the on-off control of the power supply to each unit of the digital camera from the DC-DC converter 129.

When the power supply switch 130 is turned on, the CPU 121 controls the photograph process system to be in a ready condition so that the digital camera is in the standby condition for photographing. In the photographing mode, the user confirms a photographing range of an object image by looking at the object image through the transparent optical viewfinder window 2a or the optical viewfinder window 2b of the optical viewfinder unit 2 in a clear and appropriate visual condition. After confirming the photographing range of the object image, the user depresses the release button 4 of the operation unit 123, and thereby the object image is photographed in the desired photographing range.

In more detail, when the release button 4 of the operation unit 123 is depressed, the shutter mechanism 102 of the photographic optical system 3 is opened. Then, the object image is photographed with the CCD 3 through the lens system 101. The image data of the object image is written in the PC card 110 through the digital signal processing unit 106.

When the digital camera is in the standby condition for photographing, the user can select and set the photographing mode by operating the photographing mode button 5 and confirming the set of the photographing mode on the display unit 122. Further, the user can transmit the photographed image data stored in the PC card 110 to an external computer through the transmission unit 124.

When the user carries the digital camera, as illustrated in FIG. 1, the optical viewfinder unit 2 is closed to contact the camera body 1, so that the release button 4, the photographing mode button 5, and the transmission button 6 on the upper surface of the camera body 1 are covered by the optical viewfinder unit 2, and the power supply switch 130 is turned off. When the optical viewfinder unit 2 is closed, the digital camera including the camera body 1 and the optical viewfinder unit 2 is in a shape of a rectangular solid without projections on the outer surface of the digital camera. In this closed condition of the optical viewfinder unit 2, because not only the release button 4, the photographing mode button 5, and the transmission button 6 of the operation unit 123 are not exposed but also the power supply switch 130 is turned off, an erroneous operation of the photograph process system can be prevented. Accordingly, the user can carry the digital camera without worrying about unintentional operations of the digital camera.

Because the above-described digital cameras according to the first through third embodiments include the optical viewfinder unit 2 of simple configuration for confirming a photographing range of an object image, the number of construction parts of the digital camera of the present invention is fewer than that of a digital camera including a liquid crystal display (LCD) for displaying photographed images. Therefore, a low-cost digital camera is obtained.

Further, because each optical viewfinder unit 2 according to the first through third embodiments also serves as the cover for the camera body 1, the space for the optical viewfinder unit 2 is saved in the digital camera. Accordingly, the digital camera can be made compact and portable.

In the above-described digital camera, although it is configured such that the power supply of the digital camera is turned on or off in response to the opening or closing operation of the optical viewfinder unit 2 relative to the camera body 1, the power supply may be turned on or off by manipulating a dedicated switch if the release button 4, the photographing mode button 5, and the transmission button 6 on the upper surface of the camera body 1 of the operation unit 123 are covered by the optical viewfinder unit 2.

Moreover, in the above-described digital camera, the locking mechanism is provided to prevent the optical viewfinder unit 2 from being closed when the optical viewfinder unit 2 vertically stands to the camera body 1. However, an alternative locking mechanism can be provided, in which a spring or other similar element is biased when the optical viewfinder unit 2 is rotated from the opened position to the closed position and the optical viewfinder unit 2 is locked in the closed condition. In this locking mechanism, the optical viewfinder unit 2 pops open when the optical viewfinder unit 2 is unlocked, and thus the digital camera quickly becomes ready for photographing mode. The above alternative locking mechanism is also applicable to the view plate 10 of the third embodiment.

Numerous additional modifications and variations of the present invention are possible in light of the above teachings. It is therefore to be understood that within the scope of the appended claims, the present invention may be practiced otherwise than as specifically described herein.

What is claimed as new and desired to be secure by Letters Patent of the United States is:

1. A digital camera comprising:
   a camera body having a main surface and a lens surface substantially orthogonal to said main surface;
   a photographic lens of a photographic optical system, said photographic lens positioned on said lens surface;
   a solid state imaging device coupled to said photographic optical system;
   an operation unit arranged on said main surface and having a release button and a control feature of the digital camera; and
   an optical viewfinder unit rotatably attached to said camera body such that said optical viewfinder unit is rotatable from a closed position wherein said viewfinder unit is substantially in planar contact with said main surface, to an open position wherein the viewfinder unit is substantially orthogonal to said main surface and in a plane substantially parallel to said lens surface,
   wherein when said optical viewfinder unit is in said closed position, said release button and control feature are covered and protected by said optical viewfinder unit.

2. The digital camera as claimed in claim 1, wherein said optical viewfinder unit comprises a planar structure having a rectangle shaped optical viewfinder window which serves as a field frame for defining a range of an object image.

3. The digital camera as claimed in claim 2, wherein said optical viewfinder window includes an opening defined by said field frame.

4. The digital camera as claimed in claim 2, wherein said main surface comprises first and second opposing edges and said optical viewfinder unit is rotatably attached to said main surface at an axis parallel to and in the vicinity of said second edge; and a length and width of said optical viewfinder window are set according to a field angle of said photographic lens and a width of said camera body defined by a distance from said first edge to said second edge of said main surface.

5. The digital camera as claimed in claim 4, further comprising a view plate rotatably attached to said main surface at an axis in the vicinity of said first edge such that said view plate is moveable to a position substantially orthogonal to said main surface and substantially parallel to the surface of the optical viewfinder window, said view plate having a hole positioned such that a center of the hole is substantially in line with an orthogonal line extending from a center of the optical viewfinder window.

6. The digital camera as claimed in claim 5, wherein said hole in said view plate has a diameter in a range of about 4 mm to about 7 mm.

7. The digital camera as claimed in claim 1, wherein said optical viewfinder unit comprises:

a planar structure having a rectangle shaped optical viewfinder window;

at least one transparent member positioned in said optical viewfinder window; and a pattern of marks printed on said at least one transparent member and configured to assist a user of the digital camera in defining a photographing range of an object image.

8. The digital camera as claimed in claim 7, wherein said at least one transparent member comprises a single transparent member having a predetermined thickness; and said pattern of marks comprises a pair of corresponding marks one corresponding mark printed on each of opposing sides of said transparent member such that the pair of corresponding marks are overlain as viewed by the user of the digital camera when an object image is in photographing range of the camera.

9. The digital camera as claimed in claim 8, wherein a position of said corresponding marks is determined according to the thickness of the transparent member and a field angle of a photographing lens of the photographic optical system.

10. The digital camera as claimed in claim 9, wherein each corresponding mark comprises opposing frame lines each respective frame line being parallel to sides of the transparent optical viewfinder window.

11. The digital camera as claimed in claim 9, wherein each corresponding mark comprises a frame rectangle the sides of which are parallel to respective sides of the optical viewfinder window.

12. The digital camera as claimed in claim 9, wherein each corresponding mark comprises a set of shapes printed in a vicinity of each corner of said optical viewfinder window.

13. The digital camera as claimed in claim 12, wherein said shapes in said set of shapes include at least one of an L-shape and a circle.

14. The digital camera as claimed in claim 8, wherein said transparent member is made of a transparent material selected from a group consisting of glass and plastic.

15. The digital camera as claimed in claim 7, wherein said at least one transparent member comprises two or more transparent members which are spaced apart from each other a predetermined distance; and said pattern of marks comprises a group of corresponding marks one corresponding mark printed on a surface of each transparent member such that the group of corresponding marks are overlain as viewed by the user of the digital camera when an object image is in photographing range of the camera.

16. The digital camera as claimed in claim 15, wherein a position of said corresponding marks is determined according to the distance between said transparent members and a field angle of a photographing lens of the photographic optical system.

17. The digital camera as claimed in claim 16, wherein each corresponding mark comprises opposing frame lines each respective frame line being parallel to sides of the transparent optical viewfinder window.

18. The digital camera as claimed in claim 16, wherein each corresponding mark comprises a frame rectangle the sides of which are parallel to respective sides of the optical viewfinder window.

19. The digital camera as claimed in claim 16, wherein each corresponding mark comprises a set of shapes printed in a vicinity of each corner of said optical viewfinder window.

20. The digital camera as claimed in claim 19, wherein said shapes in said set of shapes include at least one of an L-shape and a circle.

21. The digital camera as claimed in claim 15, wherein said transparent members are each made of a transparent material selected from a group consisting of glass and plastic.

22. The digital camera as claimed in claim 1, wherein said camera body comprises a rectangular solid of about 60 mm length×about 40 mm width×about 15 mm height.

23. The digital camera of claim 1, wherein said control feature of the digital camera comprises at least one of a photograph button, a display unit, and a transmission button.

24. A digital camera comprising:

means for containing optical and electrical systems of said camera, said means for containing having a main surface and an edge surface substantially orthogonal to said main surface;

a photographic lens of said optical system, said photographic lens exposed to an exterior of said means for containing through said edge surface;

a solid state imaging device coupled to said optical system;

means for executing a photographing operation and controlling features of said digital camera;

means for finding a view of an object image; and means for moving said means for finding a view of an object from a closed position substantially in planar contact with said main surface, to an open position substantially orthogonal to said main surface and substantially parallel to said edge surface, wherein when said means for finding a view is in said closed position, said means for executing and controlling is covered and protected by said means for finding a view.

25. A method of taking a photograph of an object using a digital camera including a camera body having a main surface and a lens surface substantially orthogonal to the main surface, a photographic lens positioned on the lens surface, a solid state imaging device, and an optical viewfinder unit rotatably attached to the camera body, said method comprising the steps of:

rotating the optical viewfinder unit from a closed position wherein said viewfinder unit is substantially in planar contact with said main surface to an open position substantially orthogonal to the main surface and in a plane substantially parallel to the lens surface;

aligning the object within the optical viewfinder unit; and capturing an image of the object using the photographic lens and solid state imaging device, wherein said step of rotating said optical viewfinder unit from a closed position to an open position uncovers a release button and control feature of the digital camera.

26. The method as claimed in claim 25, wherein the digital camera further includes a view plate rotatably attached to the main surface, the view plate having a hole positioned such that a center of the hole is substantially in line with an orthogonal line extending from a center of an optical viewfinder window of the optical viewfinder unit, said method further comprising the step of moving the view plate to a position substantially orthogonal to the main surface and substantially parallel to the surface of the optical viewfinder window prior to the step of aligning the object within the optical viewfinder unit.

* * * * *